US008576775B2

(12) United States Patent
Jia et al.

(10) Patent No.: US 8,576,775 B2
(45) Date of Patent: Nov. 5, 2013

(54) HYBRID-QRD-SIC AND IMBALANCED MCS SYSTEM AND METHOD FOR MIMO

(75) Inventors: Yongkang Jia, Kanata (CA); Mo-Han Fong, Kanata (CA); Zhijun Cai, Irving, TX (US); Yi Yu, Irving, TX (US); Hua Xu, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 733 days.

(21) Appl. No.: 12/768,262

(22) Filed: Apr. 27, 2010

(65) Prior Publication Data

US 2010/0271988 A1    Oct. 28, 2010

Related U.S. Application Data

(60) Provisional application No. 61/172,796, filed on Apr. 27, 2009.

(51) Int. Cl.
*H04B 1/00* (2006.01)
(52) U.S. Cl.
USPC .......................................... 370/328; 375/149
(58) Field of Classification Search
USPC .......... 370/209, 280, 281, 328; 375/146, 149, 375/260, 267, 308, 316, 345, 346
See application file for complete search history.

(56) References Cited

U.S. PATENT DOCUMENTS

| 2002/0114291 | A1* | 8/2002 | Moulsey et al. ............... 370/328 |
| 2005/0063378 | A1* | 3/2005 | Kadous ........................... 370/389 |
| 2005/0075073 | A1 | 4/2005 | Kadous et al. |
| 2006/0056338 | A1* | 3/2006 | Abe et al. ....................... 370/328 |
| 2006/0104337 | A1* | 5/2006 | Johnson et al. ................ 375/149 |
| 2008/0159192 | A1 | 7/2008 | Lee et al. |
| 2008/0188190 | A1* | 8/2008 | Prasad et al. ................ 455/114.3 |
| 2008/0207238 | A1* | 8/2008 | Tosato ........................... 455/507 |
| 2008/0254760 | A1* | 10/2008 | Wu et al. ..................... 455/343.1 |
| 2010/0008447 | A1* | 1/2010 | Mueck et al. ................. 375/299 |
| 2010/0202561 | A1* | 8/2010 | Gorokhov et al. ............. 375/295 |

FOREIGN PATENT DOCUMENTS

WO    WO2008/093298 A2    8/2008

OTHER PUBLICATIONS

International Preliminary Report on Patentability for PCT Patent Application No. PCT/US2010/032520, mailed Aug. 1, 2011.
International Search Report and Written Opinion for PCT Patent Application No. PCT/US2010/032520, mailed Nov. 29, 2010.
Wei Liu et al., A QRD-based chase decoding algorithm for quasi-orthogonal space-time block code systems, 2008 4th International Conference on Wireless Communications, Networking and Mobile Computing, IEEE Piscataway, NJ, Oct. 12-14, 2008.

(Continued)

*Primary Examiner* — Michael Thier
*Assistant Examiner* — Prince A Mensah
(74) *Attorney, Agent, or Firm* — Fish & Richardson P.C.

(57) ABSTRACT

A method and system for multiple input, multiple output (MIMO) detection and channel decoding comprising: decomposing a channel complex gain matrix into a unitary matrix and an upper right hand triangular matrix; providing a received signal to a complex conjugate transpose of the unitary matrix, thereby creating a plurality of signals; normalizing a last of the plurality of signals; channel decoding the normalized last of the plurality of signals, thereby recovering a last codeword signal; encoding the last codeword signal; utilizing the encoded last codeword signal to recover a second last codeword signal; and repeating the utilizing until all codeword signals are recovered. Also, a method and system for providing an imbalanced modulation and coding scheme for successive interference cancellation.

30 Claims, 12 Drawing Sheets

(56) References Cited

OTHER PUBLICATIONS

Taoka H et al., Field Experiments on MIMO Multiplexing with Peak Frequency Efficiency of 50 Bit/Second/Hz Using MLD Based Signal Detection for OFDM High-Speed Packet Access, IEEE Journal on Selected Areas in Communications, IEEE Service Center, Piscataway, NJ US LNKD-DOI: 10.1109/JSAC.2008.0080802, vol. 26, No. 6, Aug. 1, 2008.

QUALCOMM Europe: Link Analyses of SU-MIMO for UL of LTE-A, 3GPP Draft RI-091628 UL MIMO, 3rd Generation Partnership Project (3GPP) Mobile Competence Centre, 650, Route Des Lucioles, F-06921 Sophia-Antipolis Cedex France, no. Seoul Korea 20090328, Mar. 28, 2009.

Research in Motion et al., A Performance Study on LTE-A UL MIMO, 3GPP Draft, R1-091785, 3rd Generation Partnership Project (3GPP) Mobile Competence Centre, 650, Route Des Lucioles, F-06921 Sophia-Antipolis Cedex France, no. San Francisco, 20090428, Apr. 28, 2009.

3GPP TR 36.913 v8.0.1 (Mar. 2009), "Requirements for Further Advancements for E-UTRA (LTE-Advanced) (Relase 8)".

Alcatel-Lucent, et al., 3GPP TSG RAN WG1 56, R1-091102, "Layer Mapping for UL SU-MIMO Spatial Multiplexing", Athens, Greece, Feb. 12-16, 2009.

Broadcomm, et al., 3GPP TSG RAN WG1 Meeting #56bis, R1-091633, "WF on UL MIMO for LTE-A", Seoul, Korea, Mar. 23-27, 2009.

3GPP TSG RAN WG1 Meeting #56bis, "RAN1 Chairman notes", Seoul, Korea, Mar. 23-27, 2009.

Dirk Wubben et al., "Efficient algorithm for decoding Layered Space-Time Codes", ITG conference on source and channel coding, Jan. 2002.

W.H. Chin, "QRD Based Tree Search Data Detection for MIMO Communication Systems", VTC 2005—Spring.

Dirk Wubben et al., "MMSE Extension of V-BLAST based on Sorted QR Decomposition", VTC-2003 fall.

Christoph Studer, A. Burg and H. Bolcskei, "Soft-Output Sphere Decoding: Algorithms and VLSI Implementation", IEEE Journal on Selected Areas in Communications, vol. 26, No. 2, Feb. 2008.

P.W. Wolniansky, et al., "V-BLAST: An Architecture for Realizing Very High Data Rates over the Rich-Scattering Wireless Channel", ISSSE '98.

H. Lee and I. Lee, "New Approach for Coded Layered Space-Time OFDM Systems", proc. of ICC May 2005.

\* cited by examiner

HYBRID-QRD-SIC AND IMBALANCED MCS SYSTEM AND METHOD FOR MIMO

RELATED APPLICATIONS

The present application claims priority from U.S. Provisional Application No. 61/172,796, filed Apr. 27, 2009, the entire contents of which are incorporated herein by reference.

FIELD OF THE DISCLOSURE

The present disclosure relates to Multiple Input, Multiple Output (MIMO) communication and in particular to MIMO communication and detection algorithms.

BACKGROUND

Fourth generation wireless communications networks have a requirement of a high data throughput, for example one Gbits/s. In order to accomplish this, some systems utilize spatial multiplexed Single User Multiple Input, Multiple Output (SU-MIMO) communication to increase the data throughput.

For downlink (DL) communication, the Long Term Evolution-Advanced (LTE-A) working bodies have agreed utilize a Minimal Mean Squared Error (MMSE) MIMO detection algorithm as a benchmark in the default evaluation algorithm for a downlink receiver. Further, more advanced MIMO receiver algorithms such as a Maximum Likelihood Detector (MLD) or Turbo-Successive-Interference-Cancellation (Turbo-SIC) algorithms may be used in the Long Term Evolution (LTE) uplink and downlink.

One challenge with MIMO detection algorithms is that a tradeoff exists between good performance and low computational complexity. For example, the MMSE. MIMO detection algorithm has a relatively low complexity but its performance is not optimal. On the other hand, the maximum likelihood (ML) MIMO detector algorithm has better performance among non-iterative algorithms, but its complexity is prohibitively high when modulation order and MIMO order are high.

BRIEF DESCRIPTION OF THE DRAWINGS

The present disclosure will be better understood with reference to the drawings in which.

DETAILED DESCRIPTION

Figure 1:
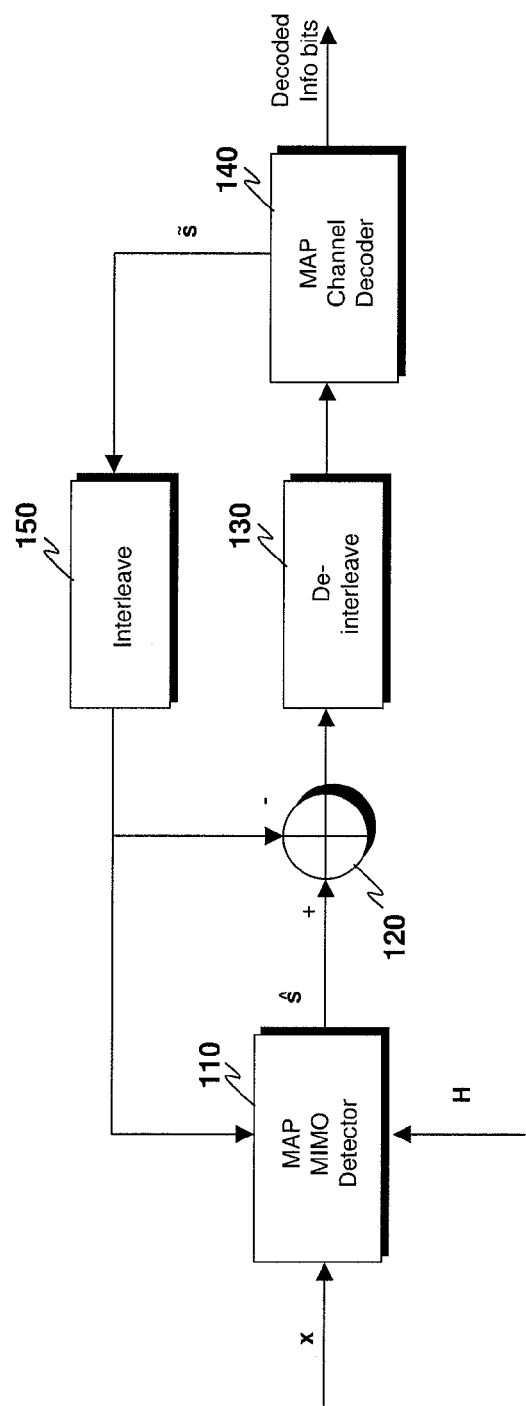
FIG. 1 is a block diagram of an iterative MIMO detection and channel decoding portion of a receiver.

The present disclosure provides a method for multiple input, multiple output (MIMO) detection and channel decoding comprising: decomposing a channel complex gain matrix into a unitary matrix and an upper right hand triangular matrix; providing a received signal to a complex conjugate transpose of the unitary matrix, thereby creating a plurality of signals; normalizing a last of the plurality of signals; channel decoding the normalized last of the plurality of signals, thereby recovering a last codeword signal; encoding the last codeword signal; utilizing the encoded last codeword signal to recover a second last codeword signal; and repeating the utilizing until all codeword signals are recovered. In one embodiment, the repeating may utilize all previously recovered codeword signals to recover a further codeword signal. In one embodiment, the utilizing may comprise: subtracting the encoded last codeword signal from a second last of the plurality of signals; normalizing the results of the subtracting, thereby creating a second last signal; and channel decoding the normalized second last signal, thereby recovering the second last codeword signal. In a further embodiment the channel decoding for the normalized last and second last of the plurality of signals may comprise performing an inverse discrete Fourier transform. In a further embodiment the channel decoding for the normalized last and second last of the plurality of signals may comprise performing a de-modulation. In a further embodiment the channel decoding for the normalized last and second last of the plurality of signals may comprises performing a de-interleaving.

A further embodiment may further comprise a third layer, wherein the second last layer and last layer normalize the gain prior to said channel decoding of said third layer. This embodiment may comprise a layer de-mapping block as part of the channel decoding.

A further embodiment may comprise a cyclic redundancy check on said first layer signal, wherein if said cyclic redundancy check fails, said encoding and subtracting steps are skipped.

A further embodiment may comprise a modulation and coding scheme for the received signal is imbalanced between codewords. This embodiment may include a more conservative codeword signal being normalized and channel decoded first. This embodiment may include decoding order being determined based on monitoring of acknowledgment and negative acknowledgments after applying the imbalanced modulation and coding scheme. This embodiment may further include the imbalanced modulation and coding scheme being signaled between an evolved node B and user equipment. The signaling may be done on a per evolved node B for all user equipment.

The present disclosure further provides a method for improving performance of a successive interference cancellation receiver for multiple input, multiple output signaling, comprising: receiving an imbalanced modulation and coding scheme for each of a plurality of codewords for the multiple input, multiple output signaling; and decoding each of the plurality of codewords in a predetermined order. In one embodiment the decoding order may determined based on monitoring of acknowledgment and negative acknowledgments after applying the imbalanced modulation and coding scheme. In one embodiment the imbalanced modulation and coding scheme may be signaled between an evolved node B and user equipment. The signaling may be done on a per user equipment basis, on a per evolved node B for all user equipment, or based on modulation and coding scheme levels. In one embodiment an evolved node B may determine receiver type by providing the imbalanced modulation and coding scheme and monitoring acknowledgments and negative acknowledgments from a user equipment.

The present disclosure further provides a receiver for multiple input, multiple output (MIMO) detection and channel decoding, the receiver configured to: decompose a channel complex gain matrix into a unitary matrix and an upper right hand triangular matrix; provide a received signal to a complex conjugate transpose of the unitary matrix, thereby creating a plurality of signals; normalize a last of the plurality of signals; channel decode the normalized last of the plurality of signals, thereby recovering a last codeword signal; encode the last codeword signal; utilize the encoded last codeword signal to recover a second last codeword signal; and repeat the utilizing until all codeword signals are recovered.

The present disclosure further provides a receiver for multiple input, multiple output (MIMO) detection and channel decoding, the receiver configured to: receive an imbalanced modulation and coding scheme for each of a plurality of codewords for the multiple input, multiple output signaling; and decode each of the plurality of codewords in a predetermined order.

The present disclosure still further provides a method for signaling a different modulation and coding scheme across different codewords between an evolved node B and user equipment, comprising: determining modulation and coding scheme offsets between the different codewords; and signaling the modulation and coding scheme offsets from the evolved node B to the user equipment In one embodiment signaling is done on a per user equipment basis. In one embodiment signaling is done on a per evolved node B for all user equipment. In one embodiment the signaling is done based on modulation and coding scheme levels.

The present disclosure still further provides a method of determining the receiver type information of a user equipment comprising: signaling a receiver type to an evolved node B.

The present disclosure provides a method of determining the receiver type information of the a equipment comprising: providing an imbalanced modulation and coding scheme; and monitoring acknowledgments and negative acknowledgments from a user equipment.

The present disclosure describes a simple efficient MIMO detection algorithm which is referred to herein as a Hybrid-QRD-SIC detection algorithm. The present disclosure further provides for an imbalanced modulation and coding scheme (MCS) with two codewords that may be used in, for example, LTE-A uplink MIMO. The present disclosure further provides over-the-air signaling to support the MIMO detection algorithm and imbalanced modulation and encoding scheme. As will be appreciated by those skilled in the art, the term "codeword" could be also be referred to as "transport block", and the terms may be used as in the LTE and LTE-A standards.

Various sub-optimal or close-to-optimal algorithms to balance performance and complexity for MIMO detectors have been proposed. Among these the MMSE-SIC, which is also known as V-BLAST, a sorted QRD-SIC detection algorithm, a QRD-M and Sphere detectors are examples of detection algorithms. However, as will be appreciated by those skilled in the art, these ML-type MIMO detection algorithms are based on a search for a solution in a finite set of possible transmit symbol combinations.

In LTE-A UL, it has been agreed among participants setting standards for the communication protocol that a single carrier frequency division multiple access (SC-FDMA) scheme will be used. As will be appreciated, with discrete Fourier transform (DFT) pre-coding in SC-FDMA, the transmitted signal on each antenna is not an M-QAM (Quaditure Amplitude Modulation) signal and may have a wide range of possible values. This makes an ML-type MIMO detector difficult to apply in the LTE-A uplink.

Further, to enhance detection performance and to approach the theoretical Shannon channel capacity, iterative MIMO detection and channel decoding may be used. As such, Maximum a posterior (MAP) MIMO detectors and MAP channel decoders can be employed in the iterations. Some complexity-reduced versions of a MAP detector/decoder such as MAX-LOG can be used without losing much performance. Nevertheless, these iterative algorithms generally have a higher computational complexity than ML-type and MMSE algorithms.

Reference is now made to FIG. 1, which shows a simplified block diagram of an iterative MIMO detector and channel decoding scheme. In the example of FIG. 1, the iteration is on a coding block basis.

In FIG. 1, a signal denoted as "x" is input into a MAP MIMO detector 110. The MAP MIMO detector 110 further has an input "H", where H is the channel complex gain matrix. The output signal vector is sent to an adder 120 which subtracts an interleave signal vector as described below.

The output from the adder 120 is provided to a De-interleave block 130 which is configured to re-arrange the signal to the original order. The signals are then provided to a map channel decoder 140, which then provides decoded information bits as an output.

MAP channel decoder 140 further provides a re-encoded signal that is then interleaved at block 150 and the interleaved signal vector, as a priori information, is provided to the adder 120 and to the MAP MIMO detector 110.

A sub-optimal iterative algorithm such as Turbo-SIC uses successive interference cancellation principals to achieve a lower computational complexity.

A MIMO system mathematical model can be simplified as:

$$x=Hs+n \qquad (1)$$

In the above, x is the received signal vector, s is the transmitted, encoded and interleaved signal vector, H is the channel complex gain matrix and n is the additive noise vector in a receiver. One independent data stream, corresponding to one element of vector s, is a "layer". With layer shifting schemes, multiple data streams are cyclically shifted before transmitting on a MIMO channel.

The object of a MIMO detector is to estimate the transmitted signal vector s based on observation x, the known or estimated channel matrix H and the statistics of noise vector n.

One less computationally complex ML-type MIMO detector is based on QR decomposition (QRD). The channel complex gain matrix is decomposed into an unitary matrix Q and an upper triangular matrix R. Thus, the decomposition is as follows:

$$H=QR \qquad (2)$$

If the conjugate transpose of matrix Q, denoted $Q^H$, is multiplied with the received signal vector, a resultant vector $\tilde{x}$ is created. This may be denoted by $\tilde{x}=Q^H x$. Further, $\tilde{n}=Q^H n$. Utilizing these two formulas, equation (1) may be rewritten as:

$$\tilde{x}=Rs+\tilde{n} \qquad (3)$$

Applying the inverse of the unitary matrix Q to the received signal x will not change the statistics of the noise. R may be written using an N×N antenna configuration as:

$$R = \begin{bmatrix} r_{11} & r_{12} & \cdots & r_{1N} \\ 0 & r_{22} & \cdots & r_{2N} \\ \vdots & \vdots & \ddots & \vdots \\ 0 & 0 & \cdots & r_{NN} \end{bmatrix} \qquad (4)$$

It may be noted based on the formulas (3) and (4), the estimation of $s_n$ only depends on values $s_{n+1} \ldots s_N$.

Figure 2:
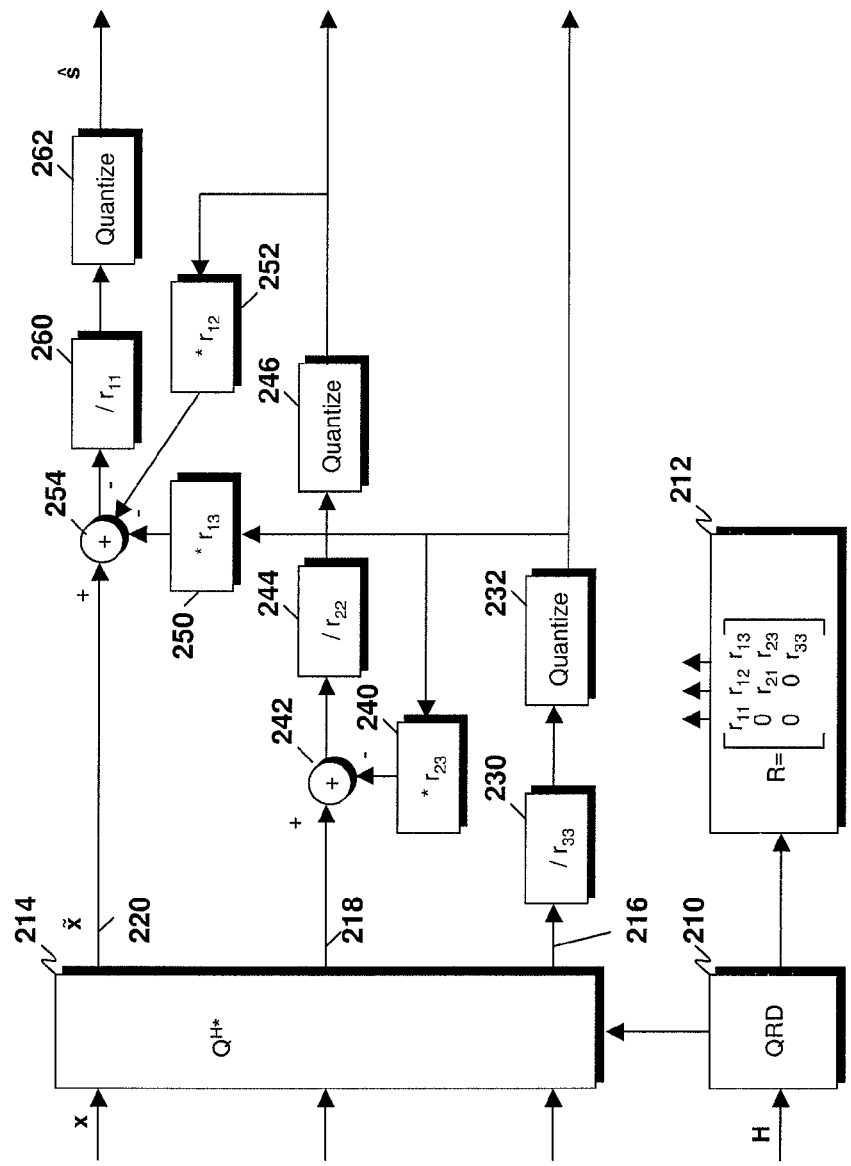
FIG. 2 is a block diagram of an exemplary conventional QRD-SIC receiver portion.

Reference is now made to FIG. 2. FIG. 2 illustrates a conventional QRD-SIC algorithm for a three layer MIMO. In the embodiment of FIG. 2, successive interference cancellation is on a symbol-by-symbol basis.

Referring to FIG. 2, the channel complex gain matrix is provided to the QR decomposition block 210, which results in a R matrix block 212 as well as the Q matrix being provided to the complex conjugate transpose block 214.

The complex conjugate transpose block 214 has inputs from the received signal vector "x". In the example of FIG. 2, the three arrows showing input from the x signal received vector correspond with the number of antennas received. This is merely meant as an example and the number of antennas received may vary.

In accordance with the above formulas, the output from block 214 provides three layers. In particular, the output 216 includes a layer three signal. Output 218 includes layer two information along with layer three information and output 220 includes layer one, two and layer three information mixed.

In order to normalize the gain to one, output 216 is divided by $r_{33}$, as shown by block 230 and the output from block 230 is quantized as shown in block 232. As will be appreciated, block 232 detects the signal M-QAM constellation and provides, as an output, the estimated transmit signal of layer three.

In order to remove the layer three signal from output 218 of block 214, the third layer signal is multiplied by $r_{23}$, as shown by block 240 and this is subtracted from the output 218, as shown by block 242. The output of block 242 provides a layer two signal with the layer three signal removed. This layer two signal is then normalized to a gain of one by dividing by $r_{22}$ as shown by block 244 and the result is then quantized 246 to provide an estimated transmit signal for the second layer.

Similarly, to remove the layer two and three signal from the output 220 of block 214, the estimated layer three output from the quantize block 232 is multiplied by $r_{13}$ and the estimated layer two output from quantize block 246 is multiplied by $r_{12}$. These multiplications are shown in blocks 250 and 252 respectively.

The outputs from 250 and 252 are then subtracted from the output 220 to remove the layer two and layer three signals. The subtraction is done at block 254.

The output 254 is then divided by $r_{11}$, as shown in block 260 to normalize the gain to one and the output of block 260 is then quantized in block 262 providing the estimated layer one output.

As will be appreciated by those skilled in the art, the FIG. 2 QRD-SIC MIMO detector has similar computational complexity and better performance compared to a linear MMSE algorithm if the layers are properly ordered. The quantization blocks make the hard decision in each layer and feedback the decision to the following layers to cancel the inter-layer interference.

The QRD-SIC algorithm is a decision feedback (DF) detection algorithm applied in the spatial domain. To reduce or eliminate the residuals from interference cancellation, in one embodiment the most reliable layer may be detected first in order to yield low or non-existent cancellation residuals. This improves the detection performance of the following layers.

The QRD-SIC algorithm of FIG. 2 however may not be applied to the LTE-A UL MIMO for various reasons.

First, in LTE-A UL, each layer's M-QAM modulated signal has been pre-coded by a DFT process before being transmitted on the MIMO channel. The signal on each MIMO layer, which is what the MIMO detector is trying to estimate, is no longer M-QAM but appears to be more of an analog signal, making the hard-decision difficult.

Second, in LTE-A UL MIMO, there is no simple way to find the optimal layer detection order. While references exist, such as Wübben et al., "*Efficient Algorithm For Decoding Layered Space-Timed Codes*", *ITG Conference On Source And Channel Coding*, January 2002, the contents of which are incorporated herein by reference, there is still no guarantee of finding the optimal layer decoding order. Post processes are typically required to achieve a better performance.

Third, in LTE-A UL, a layer shifting scheme in spatial multiplexing MIMO mode is being proposed by groups defining the standard for LTE-A. With layer shifting, all the layers have similar channel quality. Hence, the layer decoding order is not important. This may, however, not benefit SIC-type MIMO receivers.

The present disclosure provides for both single user MIMO and multi-user MIMO cases. In other words, single user MIMO cases are those in which all codewords and layers that the codewords are mapped to are transmitted from the same user equipment (UE) in the case of uplink and to the same UE in the case of downlink.

In the case of multi-user MIMO, different codewords and layers that the codewords are mapped to are transmitted from different UEs in the case of uplink and to different UEs in the case of downlink.

In case of coordinated multipoint (CoMP) transmission/reception, different codewords and layers that the codewords are mapped to could be transmitted to or received from the same cells or different cells by the UE in both single user MIMO and multi-user MIMO situation.

Figure 3:
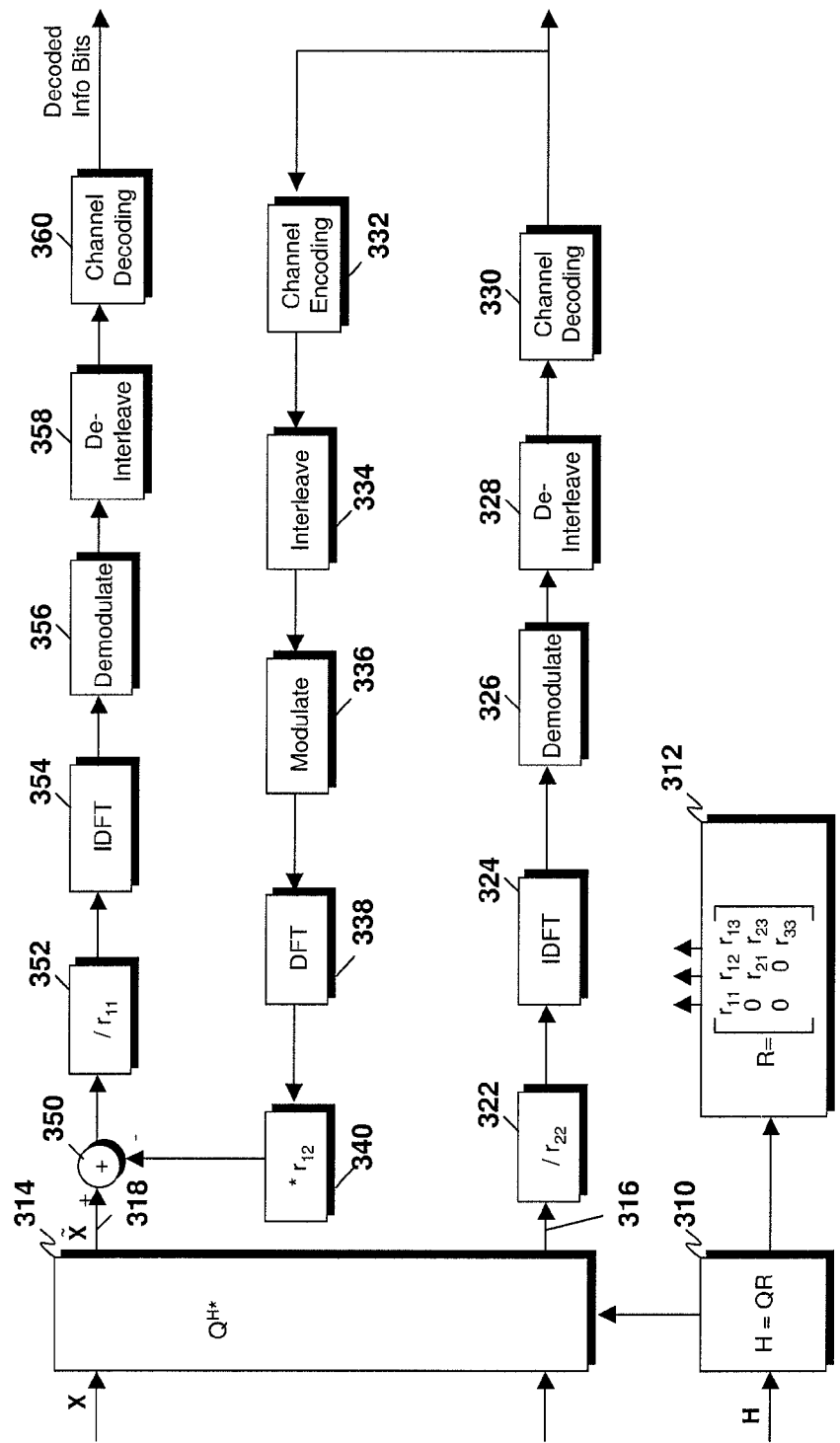
FIG. 3 is a block diagram of a Hybrid-QRD-SIC portion of a receiver having two layers and two codewords in accordance with the present disclosure.

Referring to FIG. 3, a new MIMO detection and channel decoding scheme, referred to herein as Hybrid-QRD-SIC is provided. The FIG. 3 diagram illustrates the embodiment in which each layer has separate channel coding and applies to a two-layer transmission mode. Two layers and two codewords are utilized in the example of FIG. 3. This is not meant to be limiting and can be extrapolated to more codewords or layers.

In the embodiment of FIG. 3, interference cancellation occurs after channel decoding and re-encoding processes on previous layers. This channel decoding and re-encoding process corrects a higher number of decision errors than conventional QRD-SIC, which doesn't involve channel decoding in the SIC process. Thus, the Hybrid-QRD-SIC improves performance over conventional QRD-SIC. Further in some cases conventional QRD-SIC cannot even be applied.

In FIG. 3, the channel complex gain matrix H is provided to the QRD block 310 and as a result, the Q matrix and R matrix are produced. The R matrix is shown in block 312 and the Q matrix is provided to the complex conjugate transpose block 312.

Contrary to FIG. 2, in FIG. 3 the inputs to complex conjugate transform block 314 are blocks which include a number of symbols. In FIG. 2, symbols are provided to the block 214. However, in FIG. 3 the processing is done on a block by block basis.

The inputs to block 314 are shown as having two layers and the outputs of block 314 are shown as output 316 and output 318. Output 316 corresponds with the second layer and output 318 corresponds with a combination of the second layer with a first layer.

Output 316 is provided to block 322 in which the output is divided by $r_{22}$ thus normalizing the gain of the block to one.

In LTE-A UL, the blocks are pre-coded with DFT and this should be removed in one embodiment. In this case, the output from block 322 is provided to block 324 in which the DFT pre-coding is removed.

The output of block 324 is then provided to block 326 in which the output is demodulated. This is similar to the quantization blocks 232, 246 and 262 of FIG. 2.

Once the signal is demodulated, it is provided to a de-interleave block 328 to re-arrange the symbols to the original order and the output is then provided to a channel decoding block 330. As will be appreciated, the channel decoding may correct errors made by demodulation in block 326. The output of block 330 corresponds with the second codeword.

In order to remove the second layer signal from the first layer, a feedback is also provided. Therefore the output of block 330 is also provided to block 332 in which the signal is encoded, block 334 in which interleaving is added, a modulation block 336 to modulate the signal, and a DFT coding block 338. The output of block 338 is then multiplied by $r_{12}$ as shown block 340.

As will be appreciated, the output from block 322 would generally not be provided to block 340 directly since the noise component of the signal still forms part of the signal after block 322. However, the processing in block 324, 326, 328 and 330 removes the noise and allows the signal to be recomposed in block 332, 334, 336 and 338 without or with less of the noise component, thereby providing the input to block 340.

The output of block 340 is then subtracted from output 318, as shown in block 350 to isolate layer one from layer two. The layer one output from block 350 is then divided by $r_{11}$, in block 352 to normalize the gain to one, the DFT precoding is then removed in block 354, the signal is demodulated in block 356, the signal is then De-interleaved in block 358 and finally the channel decoding is applied in block 360.

The output from channel decoding blocks 330 and 360 form the two independent code streams of the Hybrid-QRD-SIC receiver.

Figure 4:
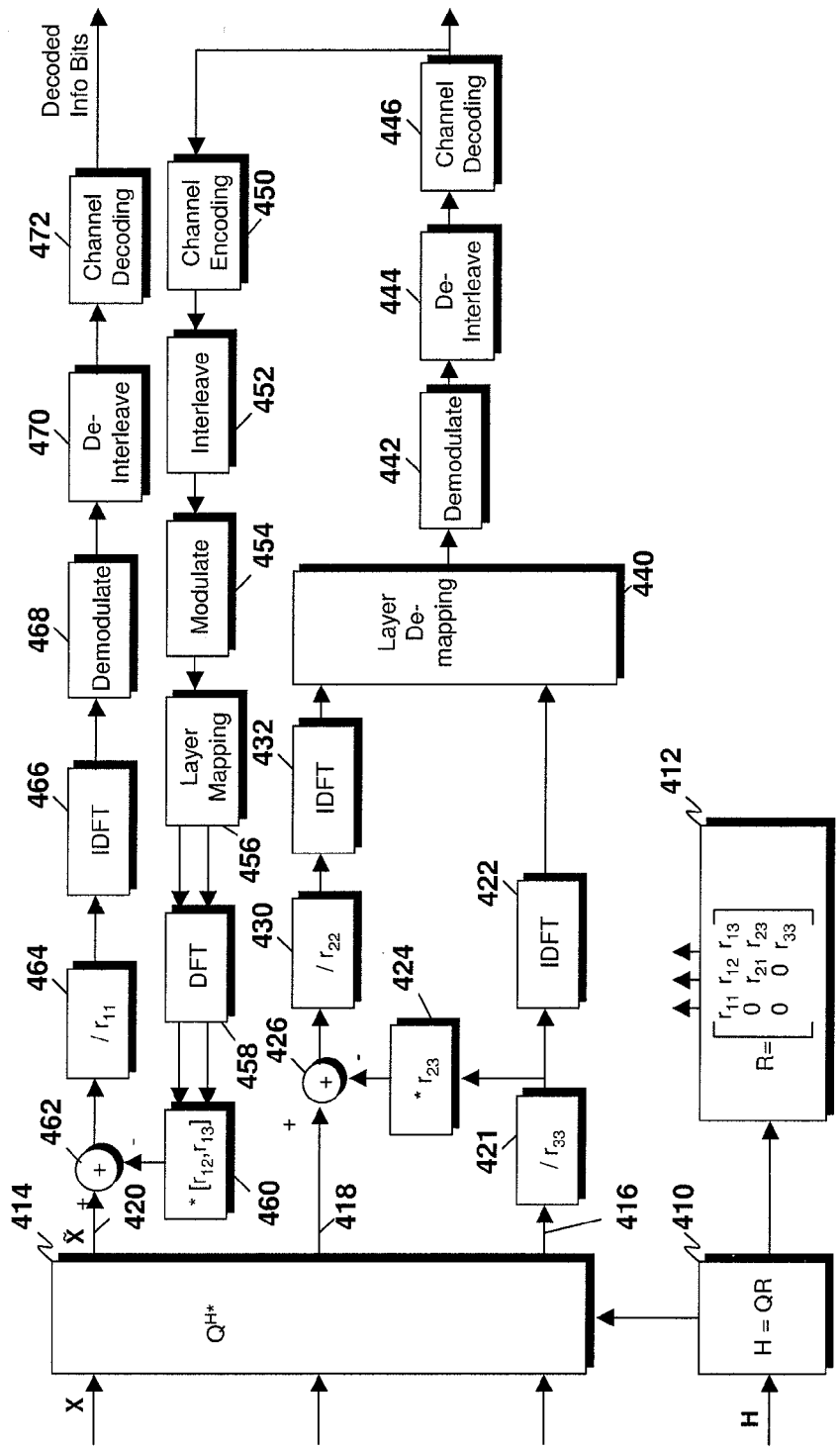
FIG. 4 is a block diagram of a Hybrid-QRD-SIC receiver having three layers and two codewords in accordance with the present disclosure.

In a further embodiment, more then two layers may be used for a transmission mode. Reference is now made to FIG. 4. FIG. 4 illustrates a block diagram in which three layers and two codewords are used as an example. The second and the third layer utilize a single codeword encoded together.

Referring to FIG. 4, the channel complex gain matrix H is provided to the QRD block 410 and the R matrix and Q matrix are separated. The R matrix is shown as block 412 and the Q matrix is provided to block 414, which takes the complex conjugate transpose. The input to block 414 further includes the blocks for the various received signal layers, which are then multiplied by the complex conjugate transpose and outputs 416, 418 and 420 are provided, as shown in FIG. 4.

Output 416 contains signal for only layer three. Output 418 contains signal for layers two and three. Output 420 includes signal for layers one, two and three.

Output 416 is then divided by $r_{33}$ as shown by block 421. This normalizes the gain to one and the output from block 421 is provided to the IDTF block 422, which removes the DFT pre-coding for the LTE-A UL signaling.

The output from block 421 is further multiplied by $r_{23}$ as shown by block 424 and the result of block 424 is then subtracted from output 418 as shown by block 426. As will be appreciated by those skilled in the art, since layer two and layer three are encoded together on the transmitter side, the output from block 421 can also be used as the input to block 424.

After the subtraction at block 426, the output is then divided by $r_{22}$, as shown by block 430 and the IDTF is performed at block 432 in which the DTF pre-coding is removed.

Outputs from block 422 and block 432 are then provided to a layer de-mapping block 440, which multiplexes the two layers into a single codeword.

The output from block 440 is provided to a demodulation block 442 in which the modulation is removed and a de-interleaving block 444 in which the interleaving is removed. The output from de-interleaving block 444 is provided to channel decoding block 446 and forms the second coded stream.

Similar to FIG. 3, the output of the second coded stream is provided to a channel encoding block 450, an interleaving block 452 and a modulation block 454.

Since the layer is de-mapped at block 440, the layer mapping needs to be reintroduced, which is done at block 456 and the output from the layer mapping block corresponding to layers two and three are then DFT pre-coded in block 458.

Each layer output from block 458 is then multiplied by the appropriate entries from the R matrix. In particular, the output associated with layer three is multiplied by $r_{13}$ and the output related to layer two is multiplied by $r_{12}$. This is done in block 460 and the results from block 460 are subtracted from output 420, as shown in block 462.

The output from block 462 corresponds with the first layer, and this is divided by the $r_{11}$ to normalize the gain, as shown in block 464.

The output from block 464 is provided to the IDTF block 466 to remove the DTF pre-coding. The output from block 466 is provided to block 468 to demodulate the signal.

The output from block 468 is provided to block 470 to de-interleave the signal. The output from block 470 is then decoded in block 472, providing a first independent coded stream.

Referring to FIGS. 3 and 4, the Hybrid-QRD-SIC detection algorithm may be used to process a received MIMO signal.

Further, adaptive techniques may be used for the SIC process. For example, after the channel decoding the receiver may perform a cyclic redundancy check (CRC). If the CRC is passed, the decoded bits will be used in the re-encoding procedure in order to decode the next codeword. If the CRC fails, the soft information from the demodulator or decoder may be used to decode the next codeword. The reason for this is when the CRC fails, the decoded bits for the first codeword in general will be harmful for the next codeword decoding due to the turbo-coding property.

As will be appreciated by those skilled in the art, the most computationally complex part of the receiving process is the Turbo channel decoder, and the QR decomposition is less complex then the matrix inverse used in an MMSE receiver when the size of the channel matrix becomes high. Thus, the proposed Hybrid-QRD-SIC scheme, in one embodiment, has similar computational complexity to an MMSE MIMO receiver.

As will be appreciated by those skilled in the art, the Hybrid-QRD-SIC is differentiated from a conventional QRD-SIC by taking the channel de-coding into the SIC process. Further, it differentiates from the Turbo-SIC process by being a one-pass process not requiring iteration.

As indicated above, detection order provides a large influence on the performance of a SIC-type MIMO receiver. In one embodiment, it is better to have the more reliable layer or codeword detected and decoded first. With the introduction of a channel decoder into the SIC process in the Hybrid-QRD-SIC process, decoding performance of each codeword dependents on not only the channel conditions but also on the modulation and coding scheme (MCS) of each codeword. The introduction of layer shifting in LTE-A UL results in the channel conditions for each layer pretending to be similar. If the MCS chosen for each codeword is the same, or the same target block error rates are set for each codeword in link adaptation mode, all codewords should have the same block error probability. In this case, the detection order is not important.

However, in one embodiment, to improve the performance of the Hybrid-QRD-SIC receiver, an imbalanced MCS for each codeword or layer may be introduced. By assigning different MCS values from more conservative to more aggressive for each codeword with a certain rule known to both the transmitter and the receiver, a receiver may be able to use the assigned rules to determine the detecting/decoding order and further improve performance.

As will be appreciated by those skilled in the art, the imbalanced MCS may be used in layer shifting mode, but may also be applied in a mode without layer shifting. Furthermore, it can be applied to any SIC-type MIMO receiver, and is not limited to the hybrid-QRD-SIC receiver of FIG. 3 or 4.

The imbalanced MCS may be enabled in a number of ways. In LTE, for downlink MIMO, each codeword has its own MCS field. In LTE-A, the current agreement between participants defining the standard to the communication technique is that for uplink MIMO, each codeword will have its own MCS level. However, in order to support an imbalanced MCS, there are still several issues.

In particular, the evolved Node B (eNB) may need to be aware that the receiver used is SIC-type receiver. Such receivers can include, but are not limited to, Turbo-MMSE-SIC or Hybrid-QRD-SIC. The awareness of the receiver type allows the application of the imbalanced MCS scheme in uplink or downlink traffic accordingly. In particular, for the uplink the eNB knows whether a SIC-type receiver is used at the eNB side, so therefore no additional signaling or communication specification changes are needed. However, for the downlink, as a SIC-type receiver is implemented at the UE side, the eNB awareness of such receiver could be helpful in applying an imbalanced MCS.

Various ways of providing the information about whether a SIC-type receiver is implemented at the UE side could be utilized.

Figure 5:
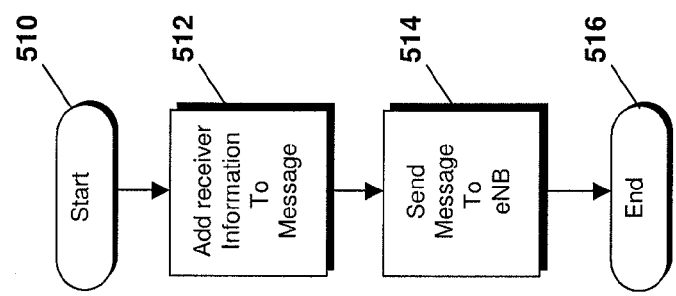
FIG. 5 is a block diagram showing a UE side method for providing receiver information to an eNB.

Reference is now made to FIG. 5. FIG. 5 is a block diagram showing a method to implement signaling of a receiver capability.

In particular, the process starts at block 510 and proceeds to block 512 in which receiver information is provided in a message. In one embodiment, the receiver capability is added to the user equipment (UE) capability information. The process then proceeds to block 514 and sends the information including the receiver capability to the eNB.

The process then proceeds to block 516 and ends.

Figure 6:
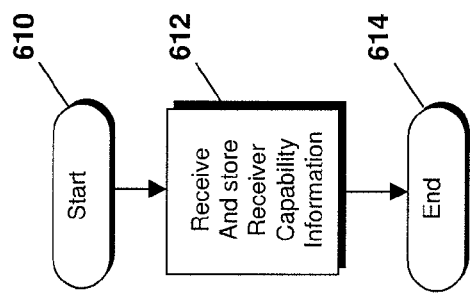
FIG. 6 is a block diagram showing an eNB side method for receiving receiver information from an UE.

On the eNB side, the corresponding process is illustrated in FIG. 6 and starts at block 610 and proceeds to block 612 in which the receiver capabilities information is received and stored at the eNB. The process then proceeds to block 614 and ends.

As will appreciated, the signaling between blocks 512 and 612 could be done through any type of signaling, including but not limited to RRC signaling. If RRC signaling is utilized, during the RRC connection set-up procedure or capability exchange procedure the UE reports its receiver information to the eNB. If the receiver is a SIC-type receiver, the eNB can then proceed to utilize the imbalanced MCS scheme.

A default setting may be provided on the eNB in which the default is a non-SIC-type receiver. Therefore, unless the eNB receives a notification that the UE has a SIC-type receiver, it assumes a non-SIC type receiver and in one embodiment the eNB may thus not use the imbalanced MCS scheme In an alternative embodiment, rather than providing a receiver capability to the eNB, the UE receiver type may be associated with a UE category. In particular, the UE category may signal the type of UE and this may be used by the eNB to determine the receiver type. The UE category may be signaled by the UE to the eNB through RRC signaling or other types of signaling.

Referring again to FIG. 5, the alternative embodiment is displayed in which block 512 utilizes the UE category rather then the receiver capability for information being sent to the eNB. In block 612 of FIG. 6, the UE category is received and stored by the eNB and further the eNB determines the receiver type based on the UE category.

In a further alternative, the receiver type may not be available to an eNB. However, the eNB may still attempt to apply an imbalanced MCS in the downlink.

In particular, the eNB could try to apply an imbalanced MCS to different codewords and monitor the ACK/NACK feedback from the downlink transmission over a certain period. If the downlink transmission of such imbalanced MCS shows improvement in its performance, this may imply that a SIC-type receiver is used at the UE and therefore an imbalanced MCS can be applied.

Figure 7:
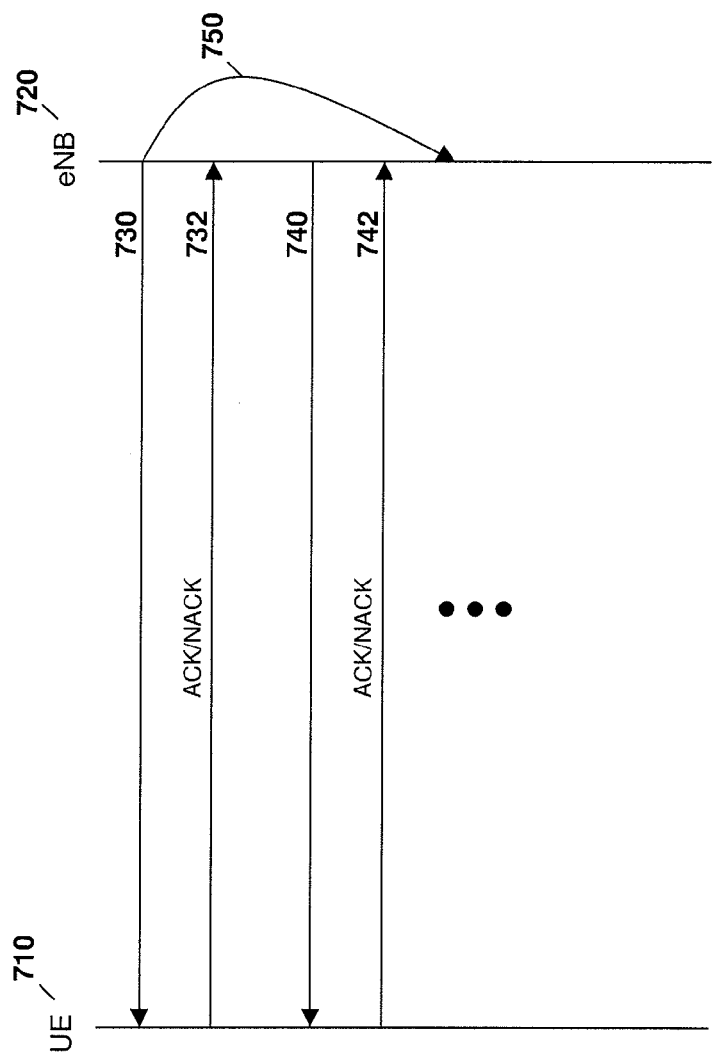
FIG. 7 is a data flow diagram showing a method to derive UE side receiver information.

The above is illustrated with regard to FIG. 7 in which UE 710 communicates with eNB 720.

eNB 720 sends a message, as shown by arrow 730 to UE 710. In the message, an imbalanced MCS is utilized.

In response to message shown by arrow 730, the UE responds with an ACK or NACK message as shown by arrow 732.

Subsequently, further data is provided from eNB 720 to UE 710 as shown by arrow 740 and an ACK/NACK message is sent in response, as shown by arrow 742.

The signaling utilizing imbalanced MCS continues with subsequent messages (not shown).

The eNB further monitors, as shown by arrow 750, the performance through the received ACK or NACK signaling and if it determines that an improvement has been achieved through the imbalanced MCS, the eNB derives that the receiver is a SIC-type receiver and therefore that an imbalanced MCS could be applied.

In a further alternative, imbalanced MCS can be applied at the UE through the addition of offsets in a channel quality indicator (CQI) to create an imbalanced CQI report on each codeword, which in turn could lead the eNB to assign an imbalanced MCS for each codeword on a packet data scheduling channel (PDSCH) transmission.

In a further aspect of the present disclosure, when an imbalanced MCS is applied, the UE or the eNB may need to be aware of which codeword should be decoded first if a SIC-type receiver is used.

As will be appreciated, for the uplink, since the receiver is in the eNB, no additional procedure is needed at the UE.

The eNB could determine the MCS for each codeword. In other words, the eNB could implement the MCS imbalance by adjusting the MCS for each codeword. In this case, in DCI format 0, the MCS for each codeword or one MCS and a MCS offset is sent to the UE. The UE proceeds with the transmission and the eNB receiver decodes two codewords in the desired order. In general, this is done by decoding the codeword with the more conservative MCS first.

For the downlink, the UE needs to know the codeword decoding order. This may be done in several ways.

In a first embodiment, a default setting of the decoding order known to both the UE and eNB is used. The default setting can be specified in the standards or can be signaled by the eNB to the UE through RRC signaling or other types of signaling in broadcast, multichannel or unicast fashions. For example, the UE may always apply the more conservative MCS for the first codeword and the more aggressive MCS becomes the second codeword. Thus the UE having a SIC-type receiver may, in this embodiment, decode the first codeword first, and then the second codeword and so on.

In an alternative embodiment, the decoding order can be based on a pre-configured rule which may be specified in the standards or signaled by the eNB to the UE through RRC signaling or other type of signaling in broadcast, multicast or unicast fashion. The pre-configured rule can be defined to make the UE SIC-type receiver and the eNB synchronized for correct decoding order with or without explicit signaling of the decoding order. For example, it may be worthwhile in some embodiments to always make the codeword with a lower MCS index more conservative, while making the codeword with the higher MCS index more aggressive. In this case, the UE can decode the codewords in the order of low to high MCS index.

In a further embodiment, dynamic signaling may be used to indicate the decoding order associated with each resource allocation on the downlink traffic channel. Such a downlink traffic channel may include, but is not limited to the physical downlink shared channel (PDSCH).

One example of dynamic signaling is on the physical downlink control channel (PDCCH). An indication may be added into the downlink DCI format to indicate which codeword should be decoded first or the decoder order.

In a further embodiment, if the decoding order is not known to the UE through the signaling or pre-configured rule or default setting, the UE still could try to apply imbalanced MCS. The eNB could first apply imbalanced MCS to each codeword in a certain way and then monitor the ACK/NACK for downlink transmissions over a certain period of time. The eNB could then adjust the MCS assignment to each codeword based on the ACK/NACK feedback until a satisfactory MCS assignment is found.

In yet a further embodiment, if the decoding order is not known to the UE through signaling or pre-configured rules or default settings, the UE may perform blind decoding on the received codewords. The UE may select one codeword for decoding first and if the decoding succeeds, the UE may then perform the SIC operation to decode the second codeword. Conversely, if the decoding fails, the UE may attempt to decode the second codeword without SIC. If the decoding of the second codeword succeeds, the UE performs a SIC operation to decode the first codeword. The same blind decoding approach can be similarly applied to the case of more than two codewords where the UE selects one of the codewords to decode first until it finds a codeword that it can decode successfully. Then the UE finds a second codeword that it can successfully decode after the SIC operation and the process proceeds in this way until all of the codewords are decoded or until decoding fails after all possible trials.

Figure 8:
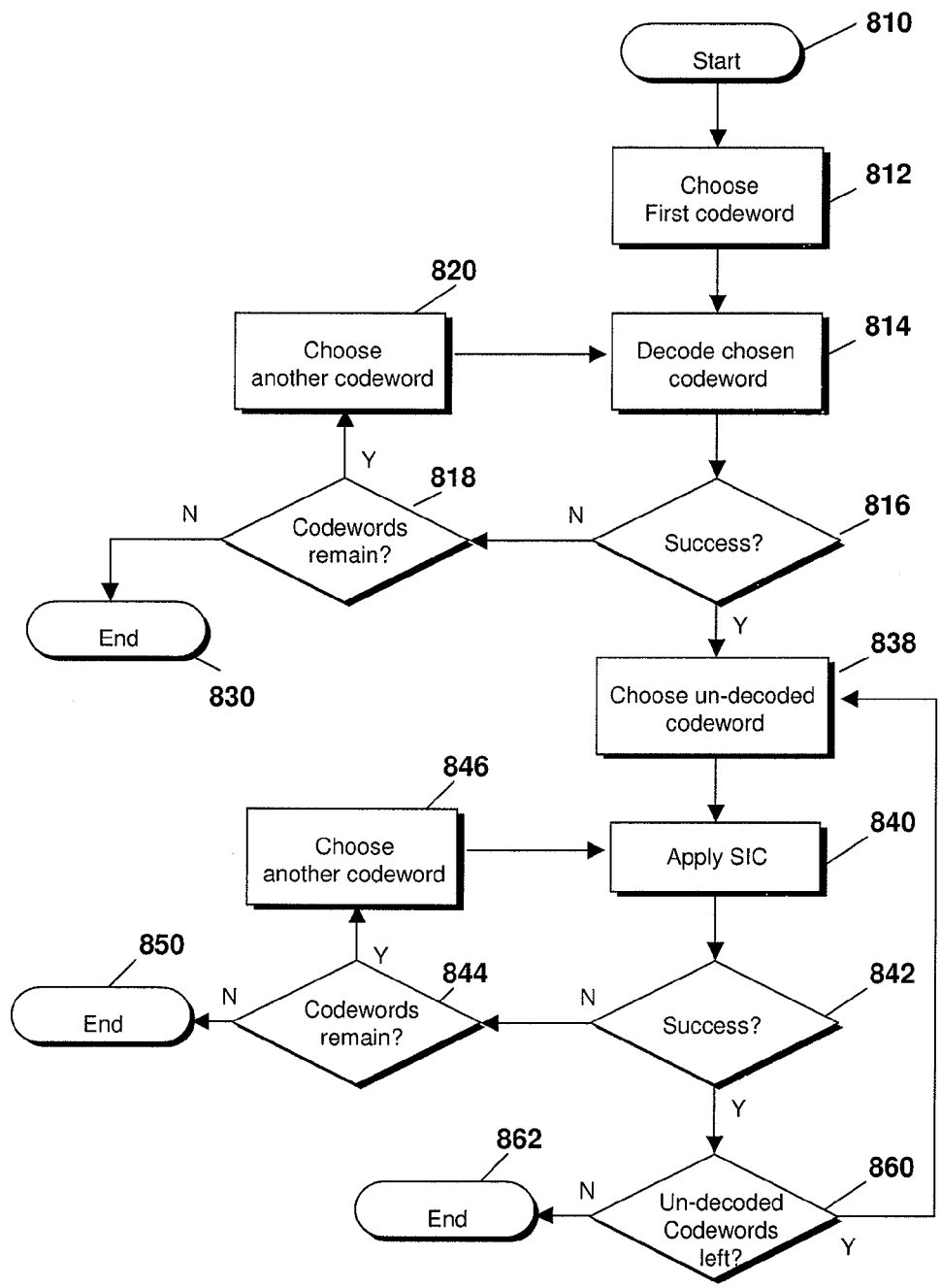
FIG. 8 is a block diagram showing a method to determine a codeword to decode by trial and error.

Reference is now made to FIG. 8. FIG. 8 illustrates the trial and error decoding as described above.

Referring to FIG. 8 the process starts at block 810 and proceeds to block 812 in which a first codeword is chosen.

The process then proceeds to block 814 in which the receiver attempts to decode using the chosen codeword.

The process then proceeds to block 816 in which a check is made to determine whether the chosen codeword was successfully decoded at block 814. If it is determined in block 816 that the codeword was not successfully decoded, the process proceeds to block 818 in which a determination is made to determine whether there are any codewords remaining for which an attempt to decode has yet to be made. If yes the process proceeds to block 820 in which a further codeword is chosen and as the process proceeds back to block 814 in which the decoding is attempted. In this way, the decoding can attempt all codewords.

If it is found in block 818 that there are no codewords left, the process proceeds to block 830 and ends. If the process proceeds to block 830, the codewords could not be successfully decoded.

From block 816, if the codeword has been successfully decoded, the process proceeds to block 838 in which an un-decoded codeword is chosen. The process proceeds to block 840 in which the SIC process is applied to a chosen codeword and utilizing the previously successfully decoded codeword(s). The process then proceeds to block 842 to determine whether there was success in decoding in block 840. If not, the process proceeds to block 844 in which a determination is made to determine if there are any codewords left that have not yet been attempted to be decoded. If there are codewords left the process proceeds to block 846 in which another codeword is chosen and the process proceeds back to block 840 in which the SIC decoding is applied on the codeword designated at block 846.

In block 844, if there are no codewords left to attempt to decode, the process proceeds to block 850 and ends. If the process proceeds to block 850 the codewords could not be successfully decoded.

From block 842, if the codeword has been decoded successfully, the process proceeds to block 860 in which a check is made to determine whether there are still any un-decoded codewords. If yes, the process then proceeds to block 838 to choose an un-decoded codeword and to block 840 where the SIC is applied with the multiple codewords that have already been decoded.

From block 860 if there are no un-decoded codewords left, the process proceeds to block 862 and ends. Proceeding to block 862 indicates that the decoding has been successful.

In a further aspect of the present disclosure, signaling may be required to provide a receiver with information about the MCS used for each codeword. While in LTE-A downlink, separate MCS fields for each codeword have been agreed upon, in general there may be different MCS signaling methods such as differentiated MCS signaling. In LTE-A uplink, it has been agreed that each transport block has its own MCS level.

The differentiated MCS signaling may be provided in two ways.

In a first way the eNB may signal the different MCS assignment of each codeword to the UE on a downlink control channel such as the PDCCH or a MAC control element (CE). The signaling is sent for each uplink PUSCH (physical uplink shared channel) resource allocation to the UE.

As an alternative, the eNB may signal the MCS assignment for one of the codewords such as the first codeword to the UE on a downlink control channel such as the PDCCH or MAC CE. The MCS assignment of the first codeword may be accomplished with an MCS offset that represents the difference between the MCS of the first and second codeword. The MCS offset can be defined based on an MCS table, effective coding rate, dB levels among other factors.

Additionally, the eNB may signal to the UE in an infrequent or semi-static matter such as through RRC signaling or MAC CE or other type of signaling in broadcast, multicast or unicast fashion, an indication of the MCS offset between the first codeword and subsequent codewords.

The semi-statically configured MCS offsets are used by the UE to deduce the MCS of subsequent codewords once the UE receives the dynamic MCS assignment of the first codeword from the eNB.

The MCS offset can be sent on a downlink radio resource control (RRC) signaling message or MAC CE or other type of signaling in broadcast, multicast or unicast fashion. The eNB can adaptively change the MCS offset from time to time based on codeword detection performance such as block error rate (BLER), number of hybrid automatic repeat requests (HARQ) retrials, among other factors.

The offset assignment can be performed in various ways. One or a number of MCS offsets may be specified per user equipment. These offset values can be applied to all MCS levels or modulation orders using the same fixed rule that can scale differently for different MCS levels or modulation orders.

In an alternative embodiment, the MCS offset assignment can be accomplished by one or a number of MCS offsets being specified per eNB for all UEs. These offset values can be applied to all MCS levels or modulation order using some fixed rule that can scale differently on different MCS levels or modulation orders.

A third option for the MCS offset assignment could be the use of one or a number of MCS offsets for each MCS level or modulation order being specified for user equipment.

A fourth option is to utilize a MCS offset table per eNB, as shown with regard to Table 1 below as an example.

TABLE 1

| CQI imbalance level | | | | | | | | | | | | | | |
|---|---|---|---|---|---|---|---|---|---|---|---|---|---|---|
| Average CQI | | | | | | | | | | | | | | |
| 1 | 2 | 3 | 4 | 5 | 6 | 7 | 8 | 9 | 10 | 11 | 12 | 13 | 14 | 15 |
| CQI Imbalance level |
| 1 | 1 | 1 | 1 | 1 | 1 | 2 | 2 | 2 | 2 | 2 | 2 | 3 | 3 | 3 |

In a further aspect of the present disclosure, signaling may be required to inform the UE when to turn on layer shifting in uplink if both layer shifting and non-layer shifting are supported. There are different ways for the eNB to send such signaling. It could be sent through a downlink control channel such as PDCCH in a more dynamic way, or it could be sent through a high-layer signal in a more semi-static way. For example, a one-bit indicator could be added to DCI format 0 to indicate if layer shifting is used. Such signaling could also include attributes related to layer shifting such as shifting patterns. A number of shifting patterns could be pre-defined and stored in both the eNB and UE. The eNB could select a shifting pattern and signal the index to the UE to start the layer shifting.

Simulation Results

Simulations conducted to evaluate the effectiveness of the balanced MCS and the use of the Hybrid-QRD-SIC are shown below. The common simulation parameters are summarized in Table 2 below.

TABLE 2

Common link-level simulation parameters

| Parameter | Value |
|---|---|
| Physical Channel | PUSCH |
| System bandwidth | 10 MHz |
| Cyclic Prefix | Normal |
| Scheduling bandwidth | 5RBs |
| Number of Tx antennas | 2 |
| Number of Rx antennas | 2 |
| Antenna correlation | Low |
| Modulation | QPSK, 16QAM, 64QAM |
| Coding rate | 1/3, 1/2, 2/3, 3/4, or adaptive |
| Link adaptation | Real, target initial Tx BLER<10% |
| CQI, PMI feedback time | 6 ms |
| Receiver type | MMSE, Hybrid-QRD-SIC, Turbo-SIC |
| Channel and noise estimation | Ideal |
| Channel model | ETU |
| Turbo channel decoder | MAX-LOG |
| Turbo channel decoder iteration | 8 |
| UE velocity | 3 kmph |
| Number of blocks simulated | 30000, or 50000 for link adaptation |

Figure 9:
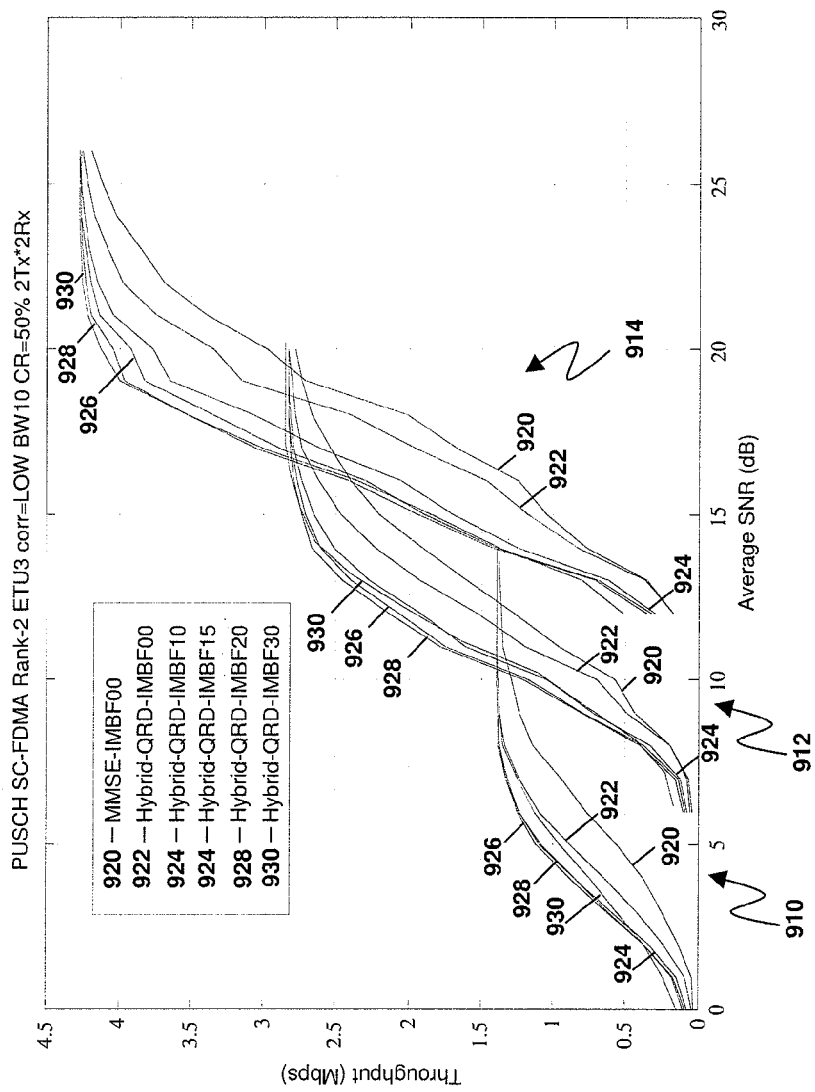
FIG. 9 is a table comparing modulation schemes and various imbalance levels in each scheme.

The use of the Hybrid-QRD-SIC with different coding rate imbalance factors and using the above assumptions is shown in FIG. 9 below. FIG. 9 shows cases in which modulation schemes of the two codewords are kept the same, but coding rates are different to achieve imbalanced MCS. The modulation types shown include the Group 1 modulation which is a QPSK modulation, illustrated by arrow 910. The second group which shows a 16-QAM modulation and is pointed to by arrow 912 and a third group which represents a 64-QAM modulation and shown by arrow 914.

As seen in the table of FIG. 9 with an imbalanced MCS, one of the two codewords has a lower coding rate than the average coding rate, while the other will have a higher coding rate. The average coding rate of both is fixed at 1/2. The coding rate imbalance is determined by the imbalance factor.

For each of the modulations, the line represented by reference numeral 920 shows an MMSE with and imbalance factor of zero, reference numeral 922 shows hybrid-QRD-SIC with an imbalance factor of zero, reference numeral 924 shows hybrid-QRD-SIC with an imbalance factor of ten percent, reference numeral 926 shows hybrid-QRD-SIC with an imbalance factor of fifteen percent, reference numeral 928 shows hybrid-QRD-SIC with an imbalance factor of twenty percent, and reference numeral 930 shows hybrid-QRD-SIC with an imbalance factor of thirty percent, In FIG. 9, the "IMBF20" as an example means plus or minus 20% coding rate imbalance of the two codewords. As can be seen from FIG. 9, a plus or minus 20% imbalance seems to be a close-to-optimal imbalance factor for QPSK, 16-QAM and 64-Qam with coding rate 1/2. With a plus or minus 20% imbalance factor, the hybrid-QRD-SIC receiver has a performance gain of about 2.5 dB to about 4 dB compared to an MMSE receiver.

It can also be observed in FIG. 9 that for a low signal to noise ratio or low modulation order, a relatively lower imbalanced factor is better than the higher imbalanced factor. For high signal to noise ratio or high modulation order, higher imbalanced factors can be tolerated and bring more gain. Therefore, in one embodiment it may be possible to adjust the imbalance factor depending on the signal to noise ratio level or modulation order. When link adaptation is applied, similarly higher imbalance factors may be used for higher signal to noise ratio and lower imbalance factors may be used for lower signal to noise ratios. The signal to noise ratio conditions of a channel could be obtained from the channel quality (CQI) feedback from the Ue for downlink transmission in frequency division duplex (FDD), or from the channel quality measured at eNB from uplink for downlink transmission in time division duplex (TDD), or from channel measured at eNB from the uplink for uplink transmission in both FDD and TDD.

Figure 10:
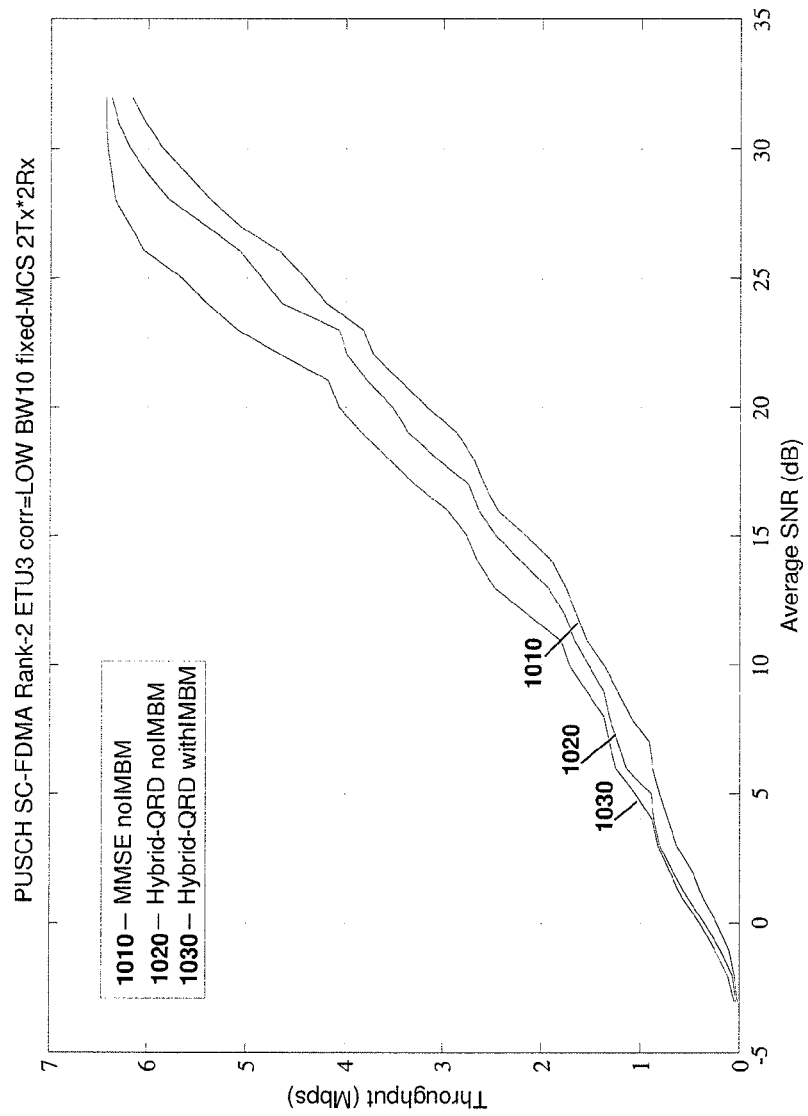
FIG. 10 is a table comparing performance of MMSE with Hybrid-QRD-SIC having both imbalanced MCS and no imbalanced MCS.

Reference is now made to FIG. 10. FIG. 10 shows the throughput envelope of a fixed MCS for MMSE, hybrid-QRD-SIC without imbalanced MCS and hybrid-QRD-SIC with a plus or minus 20% imbalance coding rate. The envelopes are taken from QPSK, 16-QAM and 64-QAM with a coding rate of 1/3, 1/2, 2/3 and 3/4.

In FIG. 10, MMSE with no imbalance is shown with reference numeral 1010, Hybrid-QRD-SIC with no imbalance is shown with reference numeral 1020 and Hybrid-QRD-SIC with an imbalance is shown with reference numeral 1030.

Similar observations can be found in FIG. 10 as those found in FIG. 9.

Figure 11:
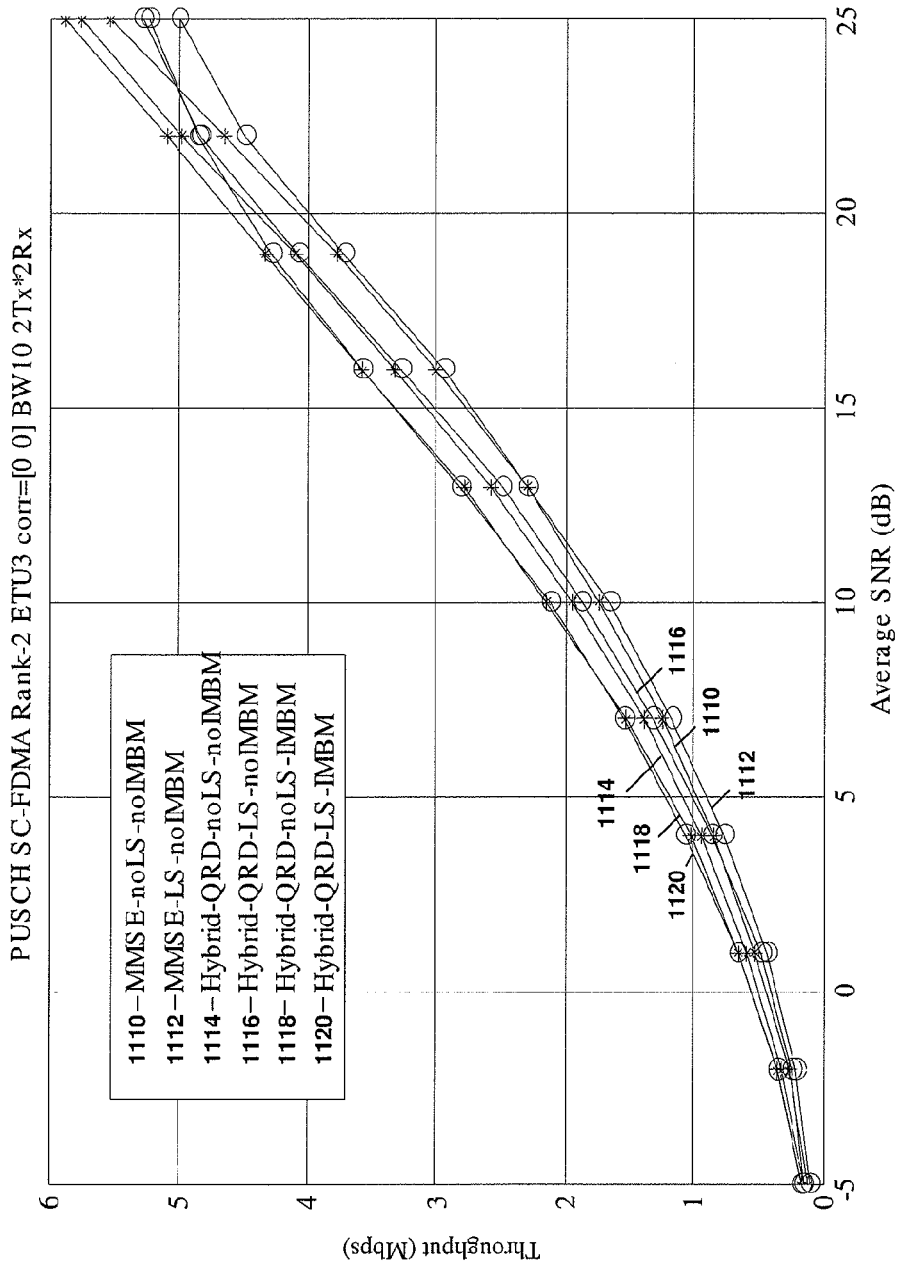
FIG. 11 is a table comparing layer shifting and no layer shifting when used with MMSE or Hybrid-QRD-SIC.

FIG. 11 shows the performance of the proposed scheme with link adaptation. A non-ideal link adaptation that targets less than 10% initial BLER is used in the simulation. In the case of layer shifting, the two MCSs are chosen to correspond with one level of a CQI index difference. Without layer shifting one MCS is chosen to be more conservative and the other is chosen to be more aggressive. The difference between the two MCS is increased one level of the CQI index compared to the case without imbalanced MCS. The number of blocks in the simulation is 50,000.

In FIG. 11, MMSE with no layer shifting and no imbalance is shown as reference numeral 1110, MMSE with layer shifting and no imbalance is shown as reference numeral 1112, Hybrid-QRD with no layer shifting and no imbalance is shown as reference numeral 1114, Hybrid-QRD with layer shifting and no imbalance is shown as reference numeral 1116, Hybrid-QRD with no layer shifting and an imbalance is shown as reference numeral 1118, and Hybrid-QRD with layer shifting and an imbalance is shown as reference numeral 1120.

As can be seen from FIG. 11, with layer shifting, the throughput performance has a small degradation as compared with no layer shifting. In the signal to noise ratio range of plus 5 dB to plus 20 dB the Hybrid-QRD-SIC without an imbalanced MCS has about a 10% performance advantage over the MMSE algorithm. The hybrid-QRD-SIC utilizing the imbalanced MCS has about a 20% throughput gain over the MMSE algorithm.

Figure 12:
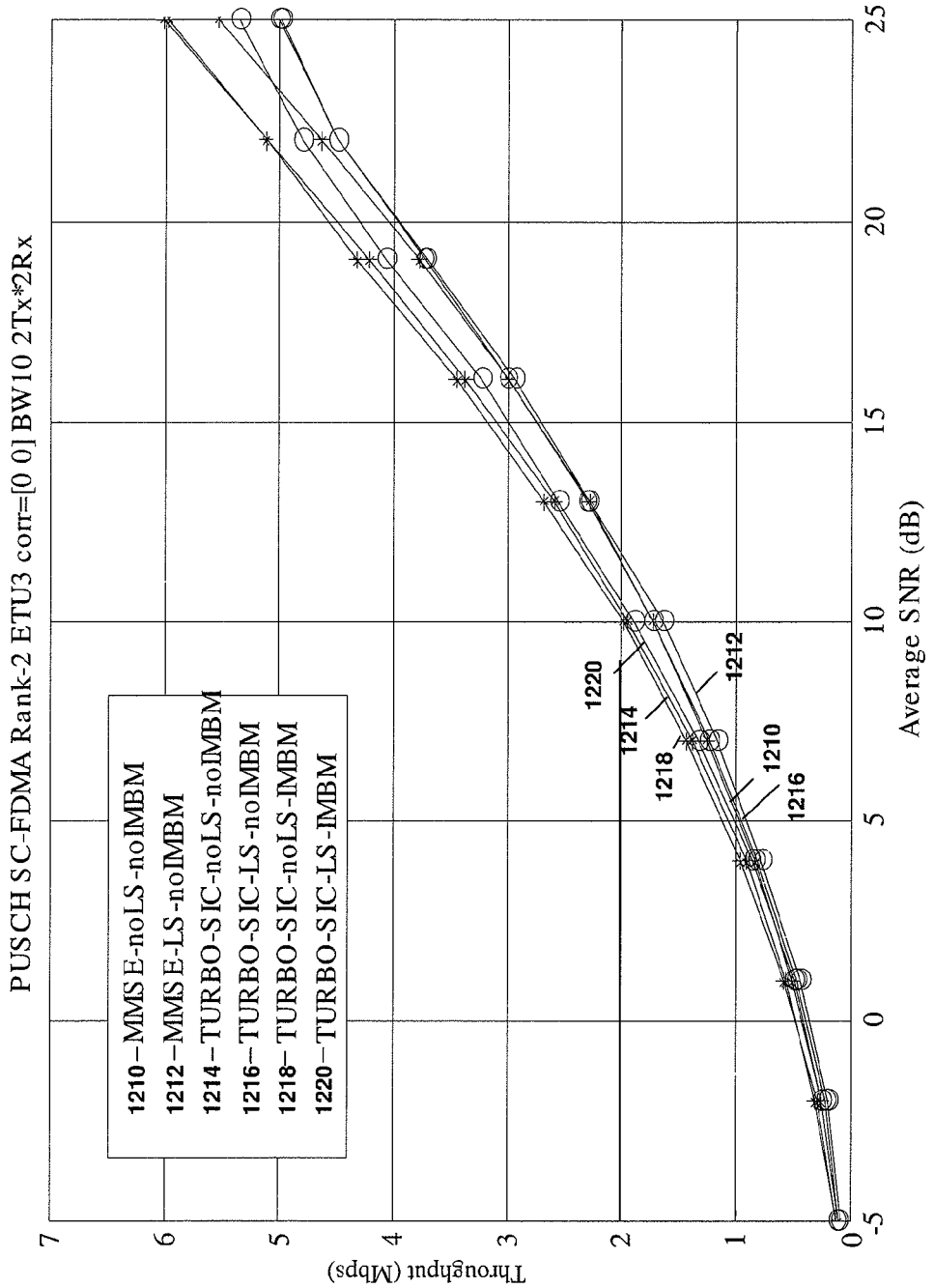
FIG. 12 is a table comparing layer shifting and no layer shifting when using MMSE or TURBO-SIC.

With regard to FIG. 12, FIG. 12 shows throughput performance of a Hard-Turbo-MMSE-SIC with link adaptation. The total number of Turbo iterations is four. The remaining simulation assumptions are the same as that depicted in FIG. 11. As can be seen in FIG. 12, the imbalanced MCS scheme is also effective for other types of turbo-SIC MIMO receivers whether or not layer shifting is performed. As noted in FIG. 12, the hard-turbo-MMSE-SIC MIMO receiver does not have much of a performance advantage over the linear MMSE receiver when layer shifting is applied and imbalanced MCS scheme is not. However, when the imbalanced MCS scheme is applied, advantages are provided. Further, comparing the FIG. 12 with FIG. 11, the proposed hybrid-QRD-SIC algorithm outperforms a hard-turbo-MMSE-SIC algorithm.

In FIG. 12, MMSE with no layer shifting and no imbalance is shown as reference numeral 1210, MMSE with layer shifting and no imbalance is shown as reference numeral 1212, TURBO-SIC with no layer shifting and no imbalance is shown as reference numeral 1214, TURBO-SIC with layer shifting and no imbalance is shown as reference numeral 1216, TURBO-SIC with no layer shifting and an imbalance is shown as reference numeral 1218, and TURBO-SIC with layer shifting and an imbalance is shown as reference numeral 1220.

While the above simulations use link adaptation, the imbalanced MCS level for the two codewords fixed to one CQI table level. This may not be optimal imbalance MCS levels in high signal to noise ratio regimes. To target about a plus or minus 20% data rate imbalance, the following CQI imbalance level table, as an example, may be used:

TABLE 3

| | CQI imbalance level | | | | | | | | | | | | | | |
|---|---|---|---|---|---|---|---|---|---|---|---|---|---|---|---|
| | Average CQI | | | | | | | | | | | | | | |
| | 1 | 2 | 3 | 4 | 5 | 6 | 7 | 8 | 9 | 10 | 11 | 12 | 13 | 14 | 15 |
| CQI Imbalance level | 1 | 1 | 1 | 1 | 1 | 1 | 2 | 2 | 2 | 2 | 2 | 2 | 3 | 3 | 3 |

Based on the above a hybrid-QRD-SIC scheme for a long-term evolution advanced (LTE-A) uplink multiple output receiver is proposed. The scheme has a similar level of computation complexity to MMSE receiver, but provides a better performance.

The receiver performance may further be improved through the use of an imbalanced MCS on different codewords. This may be used in conjunction with the Hybrid-QRD-SIC or maybe be used separately from the Hybrid-QRD-SIC schemes, for example by using it with the hard-turbo-MMSE-SIC.

Various ways for enabling the imbalanced MCS along with a signaling scheme to support an imbalanced MCS assignment are provided.

The present disclosure is not meant to be limited to the LTE uplink user MIMO. The scheme may also be applied to other MIMO models such as downlinks single use for MIMO, uplink and downlink multi-use for MIMO, CoMP transmit or receive mode, with or without layer shifting.

The above can be implemented on any user equipment on the device side and on any network element such as an evolved Node B. On the network side, the network element will include a communications subsystem to send the information concerning transport layers utilized.

Figure 13:
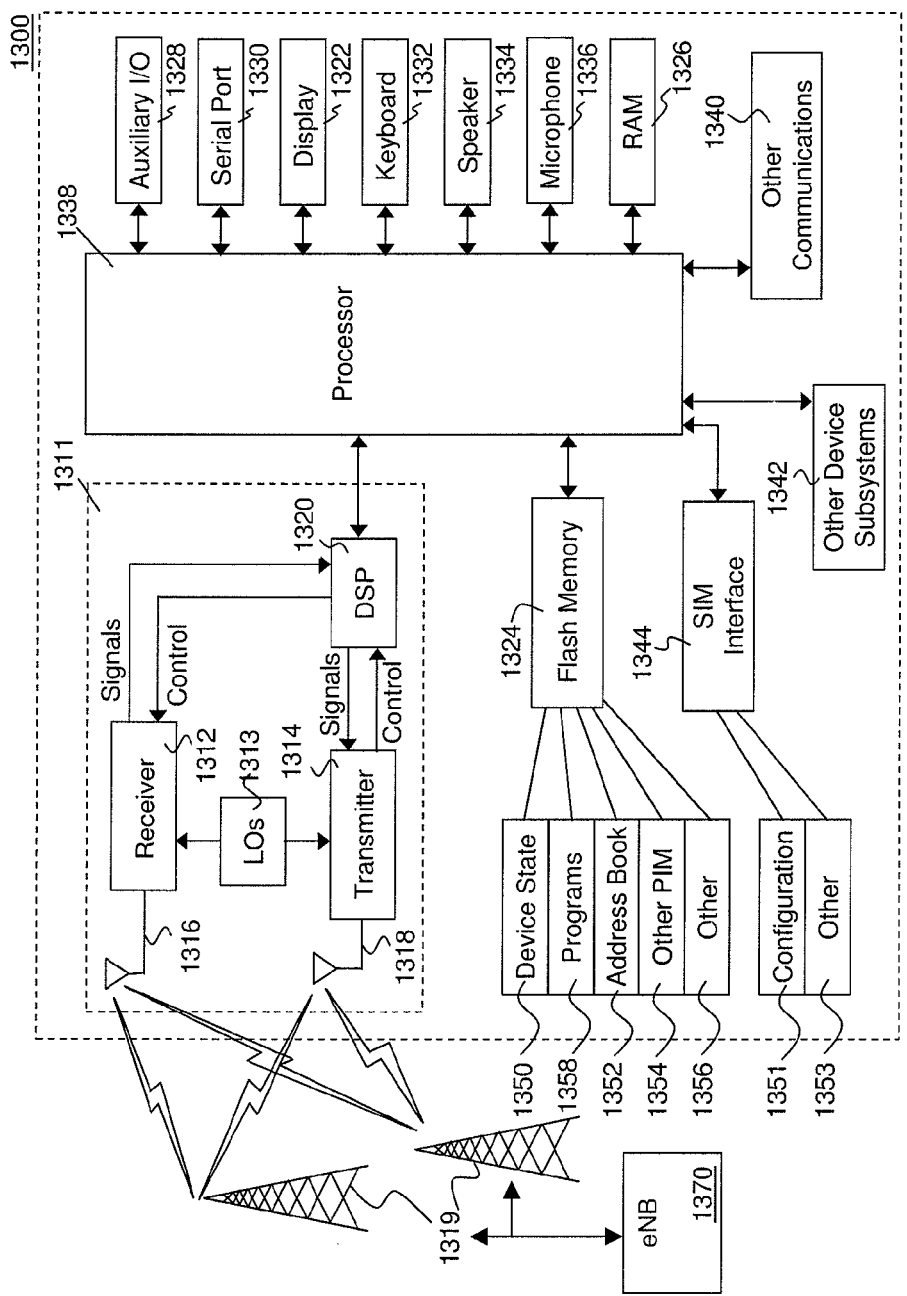
FIG. 13 is a block diagram of an exemplary user equipment capable of being used with the methods and systems of the present disclosure.

For the UE side, FIG. 13 is a block diagram illustrating a UE capable of being used with the embodiments of the apparatus and method of the present disclosure. UE 1300 is typically a two-way wireless communication device having voice communication capabilities. Depending on the exact functionality provided, UE may be referred to as a wireless device, a mobile device, a data messaging device, a two-way pager, a wireless e-mail device, a cellular telephone with data messaging capabilities, a wireless Internet appliance, or a data communication device, as examples.

Where UE 1300 is enabled for two-way communication, it will incorporate a communication subsystem 1311, including both a receiver 1312 and a transmitter 1314, as well as associated components such as one or more, embedded or internal, antenna elements 1316 and 1318, local oscillators (LOs) 1313, and a processing module such as a digital signal processor (DSP) 1320. As will be apparent to those skilled in the field of communications, the particular design of the communication subsystem 1311 will be dependent upon the communication network in which the device is intended to operate. Communication subsystem 1311 could include be a MIMO subsystem and include the systems and methods described herein.

Network access requirements will also vary depending upon the type of network 1319. An LTE UE may require a subscriber identity module (SIM) card in order to operate on the LTE or LTE-A network. The SIM interface 1344 is normally similar to a card-slot into which a SIM card can be inserted and ejected like a diskette or PCMCIA card. The SIM card may hold key configuration 1351, and other information 1353 such as identification, and subscriber related information.

When network registration or activation procedures have been completed, UE 1300 may send and receive communication signals over the network 1319. As illustrated in FIG. 13, network 1319 can consist of multiple antennas communicating with the UE. These antennas are in turn connected to an eNB 1370.

Signals received by antenna 1316 through communication network 1319 are input to receiver 1312, which may perform such common receiver functions as signal amplification, frequency down conversion, filtering, channel selection and the like, and in the example system shown in FIG. 13, analog to digital (A/D) conversion. A/D conversion of a received signal allows more complex communication functions such as demodulation and decoding to be performed in the DSP 1320. In a similar manner, signals to be transmitted are processed, including modulation and encoding for example, by DSP 1320 and input to transmitter 1314 for digital to analog conversion, frequency up conversion, filtering, amplification and transmission over the communication network 1319 via antenna 1318. DSP 1320 not only processes communication signals, but also provides for receiver and transmitter control. For example, the gains applied to communication signals in receiver 1312 and transmitter 1314 may be adaptively controlled through automatic gain control algorithms implemented in DSP 1320. Receiver 1312 and DSP 1320 may be utilized to perform the methods of FIGS. 1 to 8.

UE 1300 typically includes a processor 1338 which controls the overall operation of the device. Communication functions, including data and voice communications, are performed through communication subsystem 1311. Processor 1338 also interacts with further device subsystems such as the display 1322, flash memory 1324, random access memory (RAM) 1326, auxiliary input/output (I/O) subsystems 1328, serial port 1330, one or more keyboards or keypads 1332, speaker 1334, microphone 1336, other communication subsystem 1340 such as a short-range communications subsystem and any other device subsystems generally designated as 1342. Serial port 1330 could include a USB port or other port known to those in the art.

Some of the subsystems shown in FIG. 13 perform communication-related functions, whereas other subsystems may provide "resident" or on-device functions. Notably, some subsystems, such as keyboard 1332 and display 1322, for example, may be used for both communication-related functions, such as entering a text message for transmission over a communication network, and device-resident functions such as a calculator or task list.

Operating system software used by the processor 1338 is generally stored in a persistent store such as flash memory 1324, which may instead be a read-only memory (ROM) or similar storage element (not shown). Those skilled in the art will appreciate that the operating system, specific device applications, or parts thereof, may be temporarily loaded into a volatile memory such as RAM 1326. Received communication signals may also be stored in RAM 1326.

As shown, flash memory 1324 can be segregated into different areas for both computer programs 1358 and program data storage 1350, 1352, 1354 and 1356. These different storage types indicate that each program can allocate a portion of flash memory 1324 for their own data storage requirements. Processor 1338, in addition to its operating system functions, may enable execution of software applications on the UE. A predetermined set of applications that control basic operations, including data and voice communication applications for example, will normally be installed on UE 1300 during manufacturing. Other applications could be installed subsequently or dynamically.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application would generally have the ability to send and receive data items, via the wireless network 1319. In one embodiment, the PIM data items are seamlessly integrated, synchronized and updated, via the wireless network 1319, with the UE user's corresponding data items stored or associated with a host computer system. Further applications may also be loaded onto the UE 1300 through the network 1319, an auxiliary I/O subsystem 1328, serial port 1330, short-range communications subsystem 1340 or any other suitable subsystem 1342, and installed by a user in the RAM 1326 or a non-volatile store (not shown) for execution by the processor 1338. Such flexibility in application installation increases the functionality of the device and may provide enhanced on-device functions, communication-related functions, or both. For example, secure communication applications may enable electronic commerce functions and other such financial transactions to be performed using the UE 1300.

In a data communication mode, a received signal such as a text message or web page download will be processed by the communication subsystem 1311 and input to the processor 1338, which may further processes the received signal for element attributes for output to the display 1322, or alternatively to an auxiliary I/O device 1328.

A user of UE 1300 may also compose data items such as email messages for example, using the keyboard 1332, which is may be a complete alphanumeric keyboard or telephone-type keypad, in conjunction with the display 1322 and possibly an auxiliary I/O device 1328. Such composed items may then be transmitted over a communication network through the communication subsystem 1311.

For voice communications, overall operation of UE 1300 is similar, except that received signals may be output to a speaker 1334 and signals for transmission may be generated by a microphone 1336. Alternative voice or audio I/O subsystems, such as a voice message recording subsystem, may also be implemented on UE 1300. Although voice or audio signal output may be accomplished primarily through the speaker 1334, display 1322 may also be used to provide an indication of the identity of a calling party, the duration of a voice call, or other voice call related information for example.

Serial port 1330 in FIG. 13 would normally be implemented in a personal digital assistant (PDA)-type UE for which synchronization with a user's desktop computer (not shown) may be desirable, but is an optional device component. Such a port 1330 would enable a user to set preferences through an external device or software application and would extend the capabilities of UE 1300 by providing for information or software downloads to UE 1300 other than through a wireless communication network. The alternate download path may for example be used to load an encryption key onto the device through a direct and thus reliable and trusted connection to thereby enable secure device communication. As will be appreciated by those skilled in the art, serial port 1330 can further be used to connect the UE to a computer to act as a modem.

Other communications subsystems 1340, such as a short-range communications subsystem, is a further component which may provide for communication between UE 1300 and different systems or devices, which need not necessarily be similar devices. For example, the subsystem 1340 may include an infrared device and associated circuits and components or a Bluetooth™ communication module to provide for communication with similarly enabled systems and devices. Subsystem 1340 may also be used for WiFi or WiMAX communications.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for multiple input, multiple output (MIMO) detection and channel decoding comprising:
    decomposing a channel complex gain matrix into a unitary matrix and an upper right hand triangular matrix;
    providing a received signal to a complex conjugate transpose of the unitary matrix, thereby creating a plurality of signals;
    normalizing a last of the plurality of signals;
    channel decoding the normalized last of the plurality of signals, thereby recovering a last codeword signal;
    encoding the last codeword signal;
    utilizing the encoded last codeword signal to recover a second last codeword signal;
    and repeating the utilizing until all codeword signals are recovered.

2. The method of claim 1, wherein a modulation and coding scheme for the received signal is imbalanced between codewords.

3. The method of 2, wherein decoding order is based on a preconfigured rule.

4. The method of claim 2, wherein decoding order is associated with resource allocation on a downlink traffic channel.

5. The method of claim 2, wherein the imbalanced modulation and coding scheme is signaled between an evolved node B and user equipment.

6. The method of claim 5, wherein the signaling is done on a per user equipment basis.

7. The method of claim 5, wherein the signaling is done based on modulation and coding scheme levels.

8. The method of claim 2, wherein a receiver type is signaled to an evolved node B.

9. The method of claim 2, wherein a user equipment category associated with a receiver type is signaled to an evolved node B.

10. The method of claim 2, wherein an evolved node B determines receiver type by providing the imbalanced modulation and coding scheme and monitoring acknowledgments and negative acknowledgments from a user equipment.

11. A computer program product encoded on a non-transitory medium, the product comprising computer readable instructions for causing one or more processors to perform operations comprising:
    decomposing a channel complex gain matrix into a unitary matrix and an upper right hand triangular matrix;
    providing a received signal to a complex conjugate transpose of the unitary matrix, thereby creating a plurality of signals;
    normalizing a last of the plurality of signals;
    channel decoding the normalized last of the plurality of signals, thereby recovering a last codeword signal;
    encoding the last codeword signal;
    utilizing the encoded last codeword signal to recover a second last codeword signal; and repeating the utilizing until all codeword signals are recovered.

12. The computer program product of claim 11, wherein a modulation and coding scheme for the received signal is imbalanced between codewords.

13. The computer program product of 12, wherein decoding order is based on a preconfigured rule.

14. The computer program product of claim 12, wherein decoding order is associated with resource allocation on a downlink traffic channel.

15. The computer program product of claim 12, wherein the imbalanced modulation and coding scheme is signaled between an evolved node B and user equipment.

16. The computer program product of claim 15, wherein the signaling is done on a per user equipment basis.

17. The computer program product of claim 15, wherein the signaling is done based on modulation and coding scheme levels.

18. The computer program product of claim 12, wherein a receiver type is signaled to an evolved node B.

19. The computer program product of claim 12, wherein a user equipment category associated with a receiver type is signaled to an evolved node B.

20. The computer program product of claim 12, wherein an evolved node B determines receiver type by providing the imbalanced modulation and coding scheme and monitoring acknowledgments and negative acknowledgments from a user equipment.

21. An apparatus, comprising:
one or more processors configured to:
decompose a channel complex gain matrix into a unitary matrix and an upper right hand triangular matrix;
provide a received signal to a complex conjugate transpose of the unitary
matrix, thereby creating a plurality of signals;
normalize a last of the plurality of signals;
channel decoding the normalized last of the plurality of signals, thereby recovering
a last codeword signal; encoding the last codeword signal;
utilize the encoded last codeword signal to recover a second last codeword signal;
and repeat the utilizing until all codeword signals are recovered.

22. The apparatus of claim 21, wherein a modulation and coding scheme for the received signal is imbalanced between codewords.

23. The apparatus of 22, wherein decoding order is based on a preconfigured rule.

24. The apparatus of claim 22, wherein decoding order is associated with resource allocation on a downlink traffic channel.

25. The apparatus of claim 22, wherein the imbalanced modulation and coding scheme is signaled between an evolved node B and user equipment.

26. The apparatus of claim 25, wherein the signaling is done on a per user equipment basis.

27. The apparatus of claim 25, wherein the signaling is done based on modulation and coding scheme levels.

28. The apparatus of claim 22, wherein a receiver type is signaled to an evolved node B.

29. The apparatus of claim 22, wherein a user equipment category associated with a receiver type is signaled to an evolved node B.

30. The apparatus of claim 22, wherein an evolved node B determines receiver type by providing the imbalanced modulation and coding scheme and monitoring acknowledgments and negative acknowledgments from a user equipment.

\* \* \* \* \*

UNITED STATES PATENT AND TRADEMARK OFFICE
CERTIFICATE OF CORRECTION

PATENT NO. : 8,576,775 B2  
APPLICATION NO. : 12/768262  
DATED : November 5, 2013  
INVENTOR(S) : Yongkang Jia et al.

Page 1 of 1

It is certified that error appears in the above-identified patent and that said Letters Patent is hereby corrected as shown below:

Title Page 2, Item (56) (Other Publications), In Line 18, Delete "(Relase 8)" and insert -- (Release 8) --, therefor.

Title Page 2, Item (56) (Other Publications), In Line 2, Delete "MIMIO" and insert -- MIMO --, therefor.

In the Claims

In Column 20, In Line 16, In Claim 3, after "of" insert -- claim --.

In Column 20, In Line 55, In Claim 13, after "of" insert -- claim --.

In Column 22, In Line 4, In Claim 23, after "of" insert -- claim --.

Signed and Sealed this  
Eleventh Day of March, 2014

Michelle K. Lee  
*Deputy Director of the United States Patent and Trademark Office*